United States Patent
Ward et al.

(10) Patent No.: US 7,427,580 B2
(45) Date of Patent: Sep. 23, 2008

(54) SPINEL BASED HIGH TEMPERATURE SHIFT CATALYSTS

(75) Inventors: Andrew Mark Ward, Cleveland (GB); Sean Alexander Axon, Cleveland (GB); Paul John Murray, Cumbria (GB)

(73) Assignee: Johnson Matthey PLC, London (GB)

( * ) Notice: Subject to any disclaimer, the term of this patent is extended or adjusted under 35 U.S.C. 154(b) by 710 days.

(21) Appl. No.: 10/489,016

(22) PCT Filed: Aug. 22, 2002

(86) PCT No.: PCT/GB02/03876

§ 371 (c)(1), (2), (4) Date: Aug. 24, 2004

(87) PCT Pub. No.: WO03/022427

PCT Pub. Date: Mar. 20, 2003

(65) Prior Publication Data

US 2004/0266614 A1  Dec. 30, 2004

(30) Foreign Application Priority Data

Sep. 8, 2001 (GB) ................ 0121680.3

(51) Int. Cl.
- B01J 23/00 (2006.01)
- B01J 23/70 (2006.01)
- B01J 23/74 (2006.01)
- B01J 23/745 (2006.01)
- B01J 23/80 (2006.01)
- B01J 23/84 (2006.01)
- B01J 23/85 (2006.01)
- B01J 23/86 (2006.01)
- B01J 37/00 (2006.01)
- B01J 37/02 (2006.01)
- B01J 37/03 (2006.01)
- B01J 37/12 (2006.01)

(52) U.S. Cl. .............. 502/316; 502/314; 502/320; 502/329; 502/336; 502/338; 502/506; 502/508; 502/509; 502/524

(58) Field of Classification Search ............ 502/320, 502/316, 314, 329, 336, 338, 506, 508, 524, 502/509
See application file for complete search history.

(56) References Cited

U.S. PATENT DOCUMENTS

| | | | | |
|---|---|---|---|---|
| 3,661,609 A | * | 5/1972 | Kaufman | 106/415 |
| 3,840,479 A | | 10/1974 | Geus | |
| 4,113,658 A | * | 9/1978 | Geus | 502/242 |
| 4,305,846 A | * | 12/1981 | Jennings | 502/316 |
| 4,459,370 A | * | 7/1984 | van der Wal et al. | 502/338 |
| 4,598,062 A | * | 7/1986 | Schneider et al. | 502/306 |
| 4,618,597 A | | 10/1986 | Fiato et al. | |
| 4,629,612 A | | 12/1986 | van der Wal et al. | |
| 5,432,029 A | * | 7/1995 | Mitate et al. | 429/338 |
| 5,478,364 A | * | 12/1995 | Mitate et al. | 29/623.5 |
| 5,656,566 A | * | 8/1997 | Ward | 502/316 |
| 6,500,403 B2 | * | 12/2002 | Ward | 423/656 |

OTHER PUBLICATIONS

N.S. Clarke and P. G. Hall, Adsorption of Water Vapor by Iron Oxides. 1. Preparation and Characterization of the Adsorbents, *Langmuir*, vol. 7, No. 4, 1991, pp. 672-677.

Preeti Lahiri and Susanta K. Sengupta, "Physico-chemical Properties and Catalytic Activities of the Spinel Series $Mn_xFe_{3-x}O_4$ towards Peroxide Decomposition," *J. Chem. Soc. Faraday Trans.*, 1995, vol. 91, pp. 3489-3494.

H. Topsøe and M. Boudart, "Mössbauer Spectroscopy of CO Shift Catalysts Promoted with Lead," *Journal of Catalysis*, vol. 31, 1973, pp. 346-359.

P. S. Sidhu, R. J. Glikes and A. M. Posner, "The Synthesis and Some Properties of Co, Ni, Zn, Cu, Mn and Cd Substituted Magnetites," *J. Inorg. Nucl. Chem.*, 1978, vol. 40, pp. 429-435.

"New HTS catalyst provides greater strength," *Nitrogen*, No. 226, Mar.-Apr. 1997, pp. 43-46.

* cited by examiner

*Primary Examiner*—Timothy C. Vanoy
*Assistant Examiner*—Serena L Hanor
(74) *Attorney, Agent, or Firm*—RatnerPrestia

(57) ABSTRACT

A method is described for producing a high temperature shift catalyst, not requiring a reduction step prior to use, by precipitating a composition containing divalent and trivalent iron compounds and a modifier metal selected from trivalent chromium and/or manganese compounds from an aqueous solution containing iron and modifier metal salts with a base, and forming the resultant precipitate into shaped catalyst units, without exposing said precipitate to an oxidizing atmosphere at temperatures above 200° C.

16 Claims, No Drawings

SPINEL BASED HIGH TEMPERATURE SHIFT CATALYSTS

This application is the U.S. national phase application of PCT International Application No. PCT/GB02/03876.

This invention relates to catalysts and in particular to catalysts containing iron oxide. Such catalysts are commonly used for the so called high temperature shift (HTS) reaction wherein a gas stream containing steam and carbon monoxide is passed over the catalyst at an elevated temperature, usually in the range 350-550° C., to convert the carbon monoxide to carbon dioxide with the simultaneous formation of hydrogen.

The active catalyst is generally considered to be a spinel of the magnetite $Fe_3O_4$ structure, i.e. $Fe^{(II)}O.Fe^{(III)}_2O_3$ with typically part, for example 5-15% by weight, of the iron replaced by a trivalent modifier metal such as chromium or manganese. Usually the catalysts are supplied in the form of pellets of a precursor corresponding to a substituted haematite structure $Fe_2O_3$ and are reduced in situ by means of the process gas. We have found that, after the reduction step, the strength of such catalyst pellets is often inadequate, leading to crushing of the catalyst pellets with the formation of fines which give rise to an unacceptable pressure drop when the process gas is passed through the bed. For example whereas a typical precursor pellet may have a mean horizontal crush strength of ca 20 kg, the strength of such pellets after reduction to the active state may be decreased to less than 4 kg. We have found that if the reduced catalyst pellets are crushed and re-pelleted, strong products with a high activity are not obtained.

We have now devised a method of producing a catalyst which does not need to undergo such a reduction process.

Accordingly the present invention provides a method for producing shaped catalyst units suitable for the high temperature shift reaction comprising precipitating a composition containing divalent and trivalent iron and a trivalent modifier metal selected from chromium and manganese from an aqueous solution containing iron and modifier metal salts with a base and forming the resultant precipitate into shaped catalyst units without exposing said precipitate to an oxidising atmosphere at temperatures above 200° C.

Whereas the direct precipitation of magnetite using a base is known, e.g. from solutions of mixed valency salts (see Clarke et al, *Langmuir*, 1991, 7, 672), and the direct precipitation of magnetite containing trace amounts (<1%) of Co, Ni, Zn, Cu, Mn and Cd by oxidation of iron in ferrous sulphate solutions with basic potassium nitrate (see P. S. Sidhu et al, *J. Inorg. Nucl. Chem.*, 1978, 40, 429) are known, these documents do not teach a method for the production of shaped catalyst units containing divalent and trivalent iron and a trivalent modifier metal selected from chromium and manganese suitable for the high temperature shift reaction.

The proportion of chromium and/or manganese salts employed in the present invention is preferably such that the atomic ratio of iron to chromium (and/or manganese) is in the range 5:1 to 20:1, particularly in the range 7:1 to 15:1. Chromium is preferred to manganese. Most preferably, chromium is present at an amount in the range 5-15% by weight. It is believed that the chromium at these levels advantageously confers increased physical strength to the resulting shaped units.

Water-soluble salts of iron, chromium and/or manganese may be used as the sources of the metals. In a first embodiment, divalent and trivalent iron salts and trivalent chromium and/or manganese salts are employed, particularly in such proportions that there are 1.5 to 2.5, particularly about 2, trivalent metal atoms per divalent iron atom. In a second embodiment, only divalent iron salts and trivalent chromium and/or manganese salts are employed the divalent iron being partially oxidised by use of an oxidising agent, e.g. a metal nitrate, that converts a portion, e.g. between half and two-thirds, of the divalent iron into trivalent iron. Preferably two thirds of the divalent iron is oxidised to trivalent iron. In a third embodiment, metal salts in the trivalent state are employed and a reducing agent is used in sufficient amount to give the desired proportions of divalent and trivalent iron compounds. The reducing agent may be basic, e.g. hydrazine or non-basic, e.g. formaldehyde. In any of the embodiments, the preferred iron and chromium and/or manganese salts are chlorides or sulphates.

In each case a base is used to affect precipitation of the composition containing divalent and trivalent iron and the trivalent modifier metal. Precipitation may be achieved by addition of a base to a solution of iron and modifier metal salts or by addition of iron and modifier metal salts, preferably as an aqueous solution, to an aqueous solution of base. The base is suitably an alkali metal, especially sodium or potassium, hydroxide or carbonate. Alternatively ammonium hydroxide or carbonate may be employed. Preferably the base is an aqueous solution to improve the homogeneity of the precipitated composition.

If only divalent iron salts are present, a metal nitrate oxidising agent may be used in sufficient amount to oxidise between one-half and two-thirds of the divalent iron to trivalent iron and thus provide an optimum mixture of $Fe^{2+}$ and $Fe^{3+}$ for the formation of magnetite. Alkali metal nitrates such as sodium or potassium nitrate are preferred. The alkali metal nitrate, preferably as an aqueous solution, may be combined with the aqueous solution of iron and modifier metal salts before or concurrently with the base. Preferably the oxidising agent and base are added concurrently, for example an aqueous solution containing base and metal nitrate may be used to effect a co-incident oxidation and precipitation of the composition.

The precipitation is preferably effected at a temperature in the range 30° C. to about 100° C. (i.e. the boiling temperature), particularly 40° C. to about 100° C., and at a pH in the range 3.5-9, depending upon the route chosen to produce the magnetite. For example where mixed valency iron salts are used, the temperature is preferably in the range 30-80° C. and the pH in the range 6-9. Alternatively, where the route used is the alkaline (partial) oxidation of divalent iron salts in the presence of a nitrate, the temperature is preferably 60 to about 100° C., and the pH in the range 3.5-5.

Depending upon the starting materials and conditions, the iron and chromium compounds will generally be precipitated as oxides, hydroxides or basic carbonates. Preferably the routes used are the mixed valency route using appropriate amounts of Fe(II) and Fe(III) salts, or the alkaline (partial) oxidation of Fe(II) salts to directly generate active oxidic magnetite materials.

The precipitate is normally filtered from the mother liquor, washed with e.g. de-ionised water and acetone, and dried. Washing may be performed using heated water and/or multiple washes may be performed to reduce the chloride or sulphate content of the composition to acceptable levels. Drying in air should be effected at a temperature below 200° C., particularly at a temperature in the range 80-100° C. to prevent oxidation of the magnetite to maghemite or haematite. When oxidic materials are precipitated, there is generally no need to calcine the dried precipitate, but if adopted, calcination at temperatures above 200° C. should not be effected in air, but in an inert, non-oxidising, atmosphere.

One advantage of the process of the invention where chromium is employed is that the use and/or formation of hexavalent chromium compounds can be avoided and so health risks minimised.

After drying, the precipitate is shaped into the desired catalyst form, e.g. cylindrical pellets or tablets, typically using 1-3% by weight of a lubricant, e.g. graphite, as a tabletting aid. A granulation method may alternatively be employed wherein the dried precipitate is mixed with a small amount of liquid, often water, and the resulting damp mixture granulated or pelletised by means of a pellet mill. Alternatively, the undried precipitate may be used as the feed for a pelleting machine. Alternatively the precipitate may be mixed with a suitable binder, e.g. a calcium aluminate cement or clay and a little water and extruded to form suitably sized extrudates. Preferably the shaped catalyst units have maximum and minimum dimensions in the range 2 to 25 mm, and preferably the aspect ratio, i.e. the maximum dimension divided by the minimum dimension, is less than 2.

In a further embodiment, copper compounds are incorporated into the shaped catalyst unit. This may be done by co-precipitating a copper compound with the iron and chromium compounds, by including a suitable copper salt in the metals solution. Alternatively the precipitate, before or after drying and before or after shaping, may be impregnated with a solution of a suitable copper compound. Preferably the amount of copper incorporated amounts to 0.5 to 3% by weight of the final catalyst. Copper acts to improve the performance of the catalyst for the shift reaction, in particular at lower operating temperatures.

The performance of the shaped catalyst units may further be enhanced if they include, in addition to the precipitated composition containing divalent and trivalent iron, trivalent modifier metal and copper compounds (if present), 2 to 40% by weight of particles having an aspect ratio of at least 2 and an average (by weight) maximum dimension in the range of 500 to 1500 nm selected from alumina, alumina monohydrate, zinc oxide, iron oxide, and iron oxyhydroxide. These acicular particles provide improved physical properties, e.g. crush strength, thereby reducing the likelihood of the formation of fines.

The invention is illustrated by the following examples.

Example 1

Preparation of Catalyst Units (a) Mixed Valency Route: Iron (II) dichloride tetrahydrate (49.7 g) was dissolved in de-ionised water to provide a 250 ml solution. Similarly, iron (III) trichloride hexahydrate (135.15 g) was dissolved in de-ionised water to provide a 500 ml solution. The two solutions were combined and copper (II) chloride dihydrate (2.5 g) and chromium (III) trichloride hexahydrate (19.07 g) were added. The solution was then heated to 78° C. to ensure complete dissolution of the salts before adding aqueous 1M sodium hydroxide solution (2600 ml, 104 g NaOH) over a period of 15 minutes to the stirred solution. The solution was then allowed to cool over about 2 hours to room temperature. The resulting suspension was filtered and the solids washed three times with de-ionised water and twice with acetone before drying in an oven at 50° C. for 6 hours to yield the Cr-modified magnetite as a powdery black crystalline solid. Using a conventional washing route as described above the level of residual Cl was found to be approx. 1000 ppm. Employing a more rigorous washing procedure where the material was re-slurried with hot (50-80° C.) de-mineralised water, the residual Cl levels have been observed to drop significantly to approx. 200 ppm. The lowering of the residual Cl levels allows prolonged catalyst use at normal operating conditions.

(b) Oxidation Route: Iron sulphate heptahydrate (200 g), copper (II) sulphate pentahydrate (1.11 g) and chromium (III) sulphate monohydrate (24.48 g) were dissolved sequentially in 1400 ml de-ionised water, deoxygenated by flushing with nitrogen. The solution was heated to 72° C. and potassium nitrate (20.19 g) and potassium hydroxide (140.27 g) dissolved in 750 ml de-ionised water were added drop-wise over a period of about one hour. Nitrogen was continuously bubbled through the boiling suspension. The suspension was then refluxed for a further 30 minutes and then allowed to cool to room temperature over a further 90 minutes. The resulting grey-black precipitate was washed three times with de-ionised water until substantially free of sulphate followed by two washings of acetone before drying in an oven at 50° C. for 6 hours. By interchanging the above washing procedure for one where the material is re-slurried with hot (50-80° C.) de-mineralised water the residual $SO_4$ content of the catalyst can be lowered considerably (typically from a value of approx. 3000 ppm to one of 600 ppm). Lowering the residual $SO_4$ level in the catalyst reduces the length of the initial de-sulphurisation step during process start-up thereby increasing process efficiency.

(c) Preparation of catalyst units: Shaped catalyst units were prepared by mixing the modified magnetite samples obtained in Examples 1a-1b with 2% wt graphite, pre-compacting to a density of ca 1.5-1.6 g/cm$^3$, grinding and sieving the pre-compacted material to give a pellet feed having a particle size between 300 and 850 µm and forming pellets of dimension a 3.6 mm (±0.2 mm)×5.4 mm diameter. The pellets each weighed approximately 1.8 g and had a density of about 2.1-2.4 g/cm$^3$.

Mean Horizontal Crush Strength (MHCS) measurements were made on 5 pellets prepared from each magnetite material using CTS 0.5-tonne testing equipment with a calibrated 50 kg load. For comparison, a commercially available chromium/copper-modified haematite catalyst powder (Comparative 1) was also pelletised using the above method. The haematite pellets were subjected to a reduction stage in a hydrogen-containing gas stream to convert the haematite to magnetite, and crush tested in the same way as the magnetite pellets. The results are given in Table 1.

TABLE 1

| Catalyst Units | |
| --- | --- |
| Example | MHCS (kg) |
| Comparative 1 | 5.67 |
| 1a | 2.83 |
| 1b | 6.11 |

The results indicate that the chromium/copper modified magnetite from the 'oxidation' route provided a superior MHCS to the pre-reduced chromium/copper-modified haematite material.

Example 2

Testing of Catalyst Units

Catalyst units prepared according to Example 1 and comparative haematite-based catalyst units were subjected to laboratory-scale activity testing in a high temperature shift (HTS) reaction. Process gas (comprising by volume 14% CO, 6.5% $CO_2$, 55% $H_2$, 24.5% $N_2$+a low level of impurities including methane) and water were fed to a vaporiser at 300° C. which fed the mixed gasses to an electrically-heated 1 meter tubular reactor having a nominal id. of 25 mm. The reactor operated at 27 bar pressure had a catalyst bed volume of 200 ml. 8 ml of catalyst pellets were made up to the required 200 ml by mixing with fused alumina chips. The product gas stream emerging from the reactor was fed to a condenser and then to a catchpot from which samples could be withdrawn for analysis.

To assess the activity of the resultant catalyst, a mixture of 2 volumes of the above process gas and one volume of steam was then passed through the catalyst sample maintained at 365° C. and the outlet gas analysed. The total flow rate was varied between 500 and 2000 l/hr.

The principal measure of activity of the catalyst is the carbon monoxide % conversion. Thus, carbon monoxide % conversion was plotted against the total gas flowrate in order to identify a flowrate for each catalyst that provided 15% CO conversion (each at 365° C.). As flowrate is related to contact time between the reacting gasses and the catalyst, these data provide a relative measure of observed activity, with a higher flowrate indicating an improved catalytic activity. Pellets from Example 1(b), Comparative 1, and a second comparative catalyst consisting of a commercially available pelleted haematite-based catalyst (Comparative 2), were tested. The haematite catalysts (Comparative 1 and Comparative 2) were prior to testing subjected to a reduction step comprising subjecting them to process gas at 1250 l/hr having a steam:gas volume ratio of 1:1 and varying the temperature as follows;
(i) Ramp reactor temperature from 250° C. to 440° C. over 16 hours.
(ii) Maintain Reactor temperature at 440° C. for 4 hours.
The results are given in Table 2.

TABLE 2

Activity of Catalyst Units and Residual Crush Strength

| Example | Flowrate for 15% CO Conversion (l/hr) | MHCS (kg) |
| --- | --- | --- |
| Comparative 1 | 1267 | 1.22 |
| Comparative 2 | 943 | 2.31 |
| 1b | 1194 | 2.74 |

These results show that the 'oxidation' route magnetite material gave a superior MHCS to the haematite materials following HTS testing. The flowrate for equivalent conversion for the 'oxidation' route catalyst was almost as good as the lab-pelleted haematite material (but with over double the MHCS) and superior to the commercially available pelleted haematite-based catalyst.

In addition, the catalyst units of the present invention do not suffer from a significant volume change (i.e. shrinkage) caused by the reduction step required for haematite-based catalysts. Stable catalyst volumes confer a number of advantages such as better packing, lower pressure drop and potentially higher loadings of active catalyst in a given vessel.

The invention claimed is:

1. A method for producing shaped catalyst units, in the form of pellets, granules, tablets or extrudates, suitable for the high temperature shift reaction comprising precipitating an oxidic magnetite material containing divalent and trivalent iron and trivalent chromium from an aqueous solution containing iron and chromium salts with a base and forming the resultant precipitate into a pellet, granule, tablet or extrudate without exposing said precipitate to an oxidising atmosphere at temperatures above 200° C. wherein the aqueous solution comprises divalent iron salts and trivalent chromium salts, the divalent iron being partially oxidised by the use of an oxidising agent that converts a portion of the divalent iron into trivalent iron.

2. A method according to claim 1 wherein the oxidising agent is added concurrently with the base.

3. A method according to claim 1 wherein the oxidising agent is an alkali metal nitrate in sufficient amount to convert between about one-half to two thirds of the divalent iron to trivalent iron.

4. A method according to 1 wherein precipitation is effected at temperatures between 60 and 100° C. and a pH between 3.5 and 5.

5. A method according to claim 1 wherein the precipitated composition has an atomic ratio of iron to chromium in the range 5:1 to 20:1.

6. A method according to claim 1 wherein the shaped catalyst unit contains divalent copper at between 0.5 and 3% by weight based on the weight of the shaped catalyst units.

7. A method according to claim 1 wherein the shaped catalyst unit contains acicular particles having an aspect ratio of at least 2 and an average (by weight) maximum dimension in the range of 500 to 1500 nm, selected from alumina, alumina monohydrate, zinc oxide, iron oxide, and iron oxyhydroxide at between 2 and 40% by weight of the shaped unit.

8. A method according to claim 1 wherein said chromium is present in an amount in the range 5 to 15% by weight.

9. A shift process comprising passing a mixture of carbon monoxide and steam over a bed of shaped catalyst units, without having subjected the shaped catalyst units to a prior reduction step, said shaped catalyst units having been prepared by precipitating an oxidic magnetite material containing divalent and trivalent iron and trivalent chromium from an aqueous solution containing iron and chromium salts with a base and forming the resultant precipitate into a pellet, granule, tablet or extrudate without exposing said precipitate to an oxidising atmosphere at temperatures above 200° C. wherein the aqueous solution comprises divalent iron salts and trivalent chromium salts, the divalent iron being partially oxidised by the use of an oxidising agent that converts a portion of the divalent iron into trivalent iron.

10. A shift process according to claim 9 wherein the oxidising agent is added concurrently with the base.

11. A shift process according to claim 9 wherein the oxidising agent is an alkali metal nitrate in sufficient amount to convert between about one-half to two thirds of the divalent iron to trivalent iron.

12. A shift process according to claim 9 wherein precipitation is effected at temperatures between 60 and 100° C. and a pH between 3.5 and 5.

13. A shift process according to claim 9 wherein the precipitated composition has an atomic ratio of iron to chromium in the range 5:1 to 20:1.

14. A shift process according to claim 9 wherein the shaped catalyst unit contains divalent copper at between 0.5 and 3% by weight based on the weight of the shaped catalyst units.

15. A shift process according to claim 9 wherein the shaped catalyst unit contains acicular particles having an aspect ratio of at least 2 and an average (by weight) maximum dimension in the range of 500 to 1500 nm, selected from alumina, alumina monohydrate, zinc oxide, iron oxide, and iron oxyhydroxide at between 2 and 40% by weight on the shaped unit.

16. A shift process according to claim 9 wherein said chromium is present in an amount in the range 5 to 15% by weight.

* * * * *